(12) United States Patent
Leavy (10) Patent No.: US 8,747,642 B2
(45) Date of Patent: Jun. 10, 2014

(54) SUPERFILLING SECONDARY METALLIZATION PROCESS IN MEMS FABRICATION

(75) Inventor: Montray Leavy, Arcadia, CA (US)

(73) Assignee: Advantest America, Inc., San Jose, CA (US)

( * ) Notice: Subject to any disclaimer, the term of this patent is extended or adjusted under 35 U.S.C. 154(b) by 828 days.

(21) Appl. No.: 12/608,857

(22) Filed: Oct. 29, 2009

(65) Prior Publication Data

US 2011/0100826 A1    May 5, 2011

(51) Int. Cl.
*C25D 5/48* (2006.01)

(52) U.S. Cl.
USPC .............. 205/220; 205/170; 205/222

(58) Field of Classification Search
USPC ........................................ 205/220
See application file for complete search history.

(56) References Cited

U.S. PATENT DOCUMENTS

| | | | |
|---|---|---|---|
| 5,190,637 A * | 3/1993 | Guckel | 205/118 |
| 7,180,316 B1 * | 2/2007 | Ismail et al. | 324/756.03 |
| 7,264,984 B2 * | 9/2007 | Garabedian et al. | 438/48 |
| 2004/0000484 A1 * | 1/2004 | Sun et al. | 205/81 |
| 2006/0011483 A1 * | 1/2006 | Mayer et al. | 205/118 |
| 2006/0134820 A1 * | 6/2006 | Tang et al. | 438/48 |
| 2007/0024298 A1 * | 2/2007 | Khoo et al. | 324/754 |

OTHER PUBLICATIONS

"Monolithic Integration of 3-D Electroplated Microstructures with Unlimited Number of Levels Using Planarization with a Sacrificial Metallic Mold (PSMM)" by Yoon et al., Micro Electro Mechanical Systems, pp. 624-629 (1999).*

* cited by examiner

*Primary Examiner* — James Lin
(74) *Attorney, Agent, or Firm* — Manuel de la Cerra (57) ABSTRACT

Processes are provided herein for the fabrication of MEMS utilizing both a primary metal that is integrated into the final MEMS structure and a sacrificial secondary metal that provides structural support for the primary metal component during machining. More specifically, techniques are disclosed to increase the rate of secondary metal deposition between primary metal features in order to prevent voiding in the sacrificial secondary metal and thus enhance structural support of the primary metal during machining.

8 Claims, 4 Drawing Sheets

SUPERFILLING SECONDARY METALLIZATION PROCESS IN MEMS FABRICATION

CROSS-REFERENCE TO RELATED APPLICATIONS

This application is related to U.S. application Ser. No. 12/608,873 entitled "Multi Material Secondary Metallization Scheme In Mems Fabrication", filed on Oct. 29, 2009 by the same inventor as the present patent application, and issued on Nov. 13, 2012 as U.S. Pat. No. 8,309,382. U.S. Pat. No. 8,309,382 is expressly incorporated by reference herein in its entirety and is assigned to the same assignee as the present patent application.

FIELD OF THE INVENTION

The teachings herein are directed to new superfilling methods of depositing a sacrificial secondary metal during the fabrication of MicroElectroMechanical systems (hereinafter "MEMS").

BACKGROUND

MEMS, also known in the art as "micromachines," are typically made up of individual components and generally range in size from 5 micrometers to a millimeter. They can consist of a central unit that processes data, the microprocessor and several components that interact with the outside such as microsensors.

According to prior art methods, the components of MEMS can be formed using photolithography and sacrificial layers. For example, multiple mask exposures which are capable of producing substantially arbitrary three-dimensional shapes are disclosed in U.S. Pat. No. 5,190,637 to Guckel (hereinafter "Guckel"), which is hereby incorporated by reference in its entirety. According to Guckel, a layer of photoresist capable of exposure by radiation is applied to a plating base. The photoresist is then exposed to radiation using a mask. The mask allows the radiation to only "expose" a certain defined area of the photoresist. Subsequent developing removes photoresist selective to the exposure creating a cavity that replicates the plan of the exposure mask. The cavity formed in the photoresist is then filled by a primary metal that is electroplated on to an exposed plating base. The remaining photoresist is then removed and a secondary metal (a sacrificial metal) is electroplated over the entirety of the primary metal and plating base. The primary metal and the secondary metal are then machined by mechanical means down to a height which exposes the primary metal and planarizes the surface for subsequent processing. After machining, another layer of photoresist can be applied across both the primary and secondary metals, and then this photoresist is also patterned using the same procedures as above. After the primary metal has been electroplated into the cavity created in the photoresist, the rest of the photoresist is removed and the secondary metal is electroplated over the entirety of the first secondary metal, any exposed first primary metal and the newly added second primary metal. Both the second primary and second secondary metals are machined down to the desired thickness of the second layer of the primary metal and the process is repeated until the desired number of layers have been formed creating the desired microstructure in the primary metal. Once the microstructure has been formed, the entirety of the plating surface together with the primary and secondary metals are exposed to an etching agent that selectively etches away the secondary metal but not the primary metal, thus leaving only the primary metal and the plating surface.

According to the teachings of Guckel, the secondary metal is used in conjunction with the photoresist because of the structural stability that it affords the primary metal during machining Machining cannot generally be done using only the photoresist and the primary metal because the photoresist is relatively weak mechanically and may not adequately support the primary metal from damage due to the largely lateral forces encountered in the mechanical machining process (which may include, grinding, lapping, polishing, chemomechanical polishing, electric discharge machining, or any other commonly encountered machining process). Another advantage the secondary metal affords is that it conveniently provides a conductive plating base for subsequent layers of primary metal that overhang underlying primary metal structures. Otherwise, the overhanging plating would require an additional thin film seed layer deposition step.

However, significant problems arise using the Guckel method when multiple or very laterally large microstructures are built on a single substrate, such as when manufacturing MEMS to be used as semiconductor testing probe heads. Plating the secondary metal across the entirety of the plating surface, (e.g., ceramic), causes the plating base to bow and warp under the stress of the additional sacrificial metal. This, in turn, causes two related problems: 1) it becomes difficult or impossible to machine the different layers to a uniform thickness and 2) it becomes difficult or impossible to perform the lithography because micro-lithography requires a planar surface.

U.S. Pat. No. 7,264,984 to Garabedian, et al. (hereinafter "Garabedian") and U.S. Pat. No. 7,271,022, to Tang et al. (hereinafter "Tang"), both of which are incorporated by reference herein in their entireties, improved upon the teachings of Guckel by disclosing processes for creating micromechanical and MEMS structures, such that multiple or large structures may be built on the same substrate, without the substrate warping. More specifically, Tang discloses a method where the secondary metal is not plated over the entirety of the substrate's structured area. Instead the secondary metal is only plated in an area surrounding the primary metal structure, creating an "island," so that it lends its structural stability to the primary metal structure, but does not cause undue stress on the substrate. According to the teachings in Tang, the sacrificial secondary metal is only plated where it is needed for mechanical stability and for the creation of structural overhangs, instead of requiring the secondary metal to be formed in the entire area encompassing all structural metal regions on the substrate.

Despite the improvements advanced in Garabedian and Tang, the secondary metallization process can lead to voiding in the secondary metal in between primary metal structures, using current deposition techniques. Voiding is undesirable as it minimizes the structural support the secondary metal provides the primary metal during the machining process. Due to the susceptibility of voiding in the secondary metallization process using current depositary techniques, there is a need in the art to provide a void-free secondary metallization scheme as part of the MEMS fabrication process.

While attempts have been made in the past to address voiding in the deposition of primary metals in cavities, such as during semi-conductor fabrication, these techniques focus on voiding in terms of electrical conductivity in metals that are integral to the final completed structure. Examples of superfilling primary metals for semi-conductor fabrication, are set forth in U.S. Pat. No. 6,946,716 to Andricacos, et al. (hereinafter "Andricacos") and U.S. Pat. No. 6,432,821 to Dubin, et al. (hereinafter "Dubin"), both of which are incorporated herein in their entireties. The methodology provided in these disclosures is in sharp contrast to the present teachings, wherein superfilling is used with a secondary metal that surrounds the primary metal and is sacrificial, such that it is eventually etched away from the primary metal after the primary metal has been machined.

It is important to note that neither Andricacos nor Dubin address the problem of voiding in MEMS fabrication. More specifically, these references are silent as to the voiding of secondary sacrificial metals that surround and provide mechanical support to primary metals during machining It is thus an objective of the teachings herein to address this need in the art.

SUMMARY OF THE INVENTION

Embodiments herein are directed to processes for fabricating a component of a micro-electro-mechanical system, that include providing a primary metal structure having cavities along its surface area; depositing a sacrificial secondary metal around the primary metal structure, such that the rate of deposition is faster within the primary metal structure's cavities than outside of the cavities, to form a complex of primary and secondary metal; machining the complex of primary and secondary metal; and etching away the secondary metal from the machined primary metal structure to form a micro-electro-mechanical system component.

Preferably the etching away of the sacrificial secondary metal does not substantially etch the machined primary metal structure. Advantageously, the deposited secondary metal provides horizontal mechanical support to the primary metal during machining The processes herein can include steps wherein the primary metal includes nickel and the secondary metal includes copper. Advantageously, the deposited secondary metal lacks significant voiding. Voiding can be avoided when the deposited sacrificial secondary metal is electroplated from a plating bath comprising organic additives selected from the group consisting of brighteners, levelers, and suppressants, for example. More specifically, the plating bath can include copper at 50 g/l, acid at 80 g/l, chloride at 50 ppm, a brightener at 12 mL/L, a suppresser at 2 mL/L, and a leveler at 3 mL/L. Preferred micro-electro-mechanical systems that can be made using these processes include a spring configured to be used in conjunction with a probe card assembly to test semiconductor devices.

Further embodiments are directed to an intermediary metallic complex to be used in the fabrication of a micro-electro-mechanical system component, that include a structure of primary metal having cavities along its surface area and that is configured to be integrated into the fabricated micro-electro-mechanical system component; and a sacrificial secondary metal deposited around the primary metal structure such that it lacks significant voiding in the cavities, and is configured to be etched away without etching the primary metal structure.

Advantageously, the deposited secondary metal can provide horizontal mechanical support to the primary metal structure during machining According to more specific embodiments, the primary metal structure includes nickel and the sacrificial secondary metal includes copper. Preferred fabricated micro-electro-mechanical systems include a spring configured to be used in conjunction with a probe card assembly to test semiconductor devices.

It will be appreciated that the drawings are not necessarily to scale, with emphasis instead being placed on illustrating the various aspects and features of embodiments of the invention.

DETAILED DESCRIPTION OF THE ILLUSTRATED EMBODIMENTS

Embodiments of the present invention are described below. It is, however, expressly noted that the present invention is not limited to these embodiments, but rather the intention is that modifications that are apparent to the person skilled in the art and equivalents thereof are also included.

MEMS

The teachings herein are directed to MEMS fabrication. MEMS generally relate to small integrated devices or systems that combine electrical and mechanical components and can be any number, from a few to millions, in a particular system. Examples of MEMS applications can non-exclusively include inkjet-printer cartridges, accelerometers, miniature robots, microengines, locks, inertial sensors, microtransmissions, micromirrors, micro actuators, optical scanners, fluid pumps, semi-conductor probes, transducers, and chemical, pressure and flow sensors. MEMS can be capable of sensing, controlling, and activating mechanical processes on the micro scale, and function individually or together to generate effects on the macro scale. The micro fabrication technology enables fabrication of large arrays of devices, which individually perform simple tasks, but in combination can accomplish complicated functions. MEMS can non-exclusively include one or more mechanical elements such as beams, gears, diaphragms, and springs, and the like, for example. The teachings herein can be used to fabricate any suitable MEMS or component of a MEMS.

According to certain embodiments, the processes provided herein can be used to form a primary metal, micro-machined spring that can be used in conjunction with a probe card assembly to test semiconductor devices such as those built by Touchdown Technologies, Inc. of Baldwin Park, Calif. or those built by Form Factor of Livermore, Calif. In cases where the structure formed is a micro-machined spring, many micro-machined springs may be built on a single substrate using the processes herein, such that many springs may contact a wafer of semiconductor chips at one time. Using the processes presented herein allows for micro-machined springs to be built over a larger area of a single substrate and at a substantially reduced cost then current processes known in the art.

Primary Metal

Primary metal 700 generally relates to a metal that is integrated in the final MEMS product, and can be any suitable metal, such as Nickel, Nickel-alloy, Rhodium, Ni—Mn, Ni—Co, Ni—W, Ni—Cu, Sn, Sn—Pb, Sn—Ag, and Ag. A sacrificial secondary metal 800 can be used to surround any suitable MEMS component made of a primary metal 700. According to certain embodiments, the primary metal 700 is electroplated onto a plating base on top of a substrate utilizing photolithography. FIGS. 3-6 are referenced in this process. A substrate 100 is provided, and may be any type of substrate, such as silicon, germanium and gallium arsenide, ceramics such as alumina, aluminum, nitride low temperature cofired ceramics (LTCC) and high temperature cofired ceramics (HTCC), metals or glasses. The substrate 100 can include built in vias 110 such that electricity may be conducted from the top surface of the substrate 100 to the lower surface. In certain embodiments, the vias 110 can be made from gold, but any other conductor such as copper or platinum may also be used. The substrate 100 may also contain electrical redistribution conductors, making it an electrical "space transformer" as is commonly known in the art.

A plating surface 200, such as Cr/Au seed layer, can be applied to the upper surface of the substrate 100. The plating surface 200 is the conductive adhesion layer and plating seed for the primary metal 700 that will form the microstructure to be electroplated on at a later time. The plating surface seed layer 200 may be deposited on the substrate 100 by use of a sputtering machine, or the plate surface seed layer 200 may be e-beam evaporated, spincoated conductive polymer, or electroless plated. The plating seed layer 200 may be any of the commonly known materials and material combinations, such as Cr under Au, Ti under Cu, Ti—W under Au, etc. While in some embodiments, the substrate 100 may not have a via 110 (for instance for building microstructures which do not need to be electrically connected to or through the substrate), if vias 110 are present in the substrate 100, it is preferable that the seed layer 200 be electrically coupled to the vias 110 such that structures built on top of the seed layer 200 may conduct electrical signals through the substrate 100. The seed layer 200 is usually fairly thin and may be applied in a composition of 300 A of Cr and 2000 A of Au, although other compositions and thicknesses may be used in different amounts without departing from the spirit of this invention. If the substrate 100 is made of metal, a plating base may not be used, as the metal may constitute the plating base. Additionally, structures such as dielectric films and interconnect stacks including conductors and dielectric films may lie between the substrate 100 and the plating seed 200 without departing from the spirit of the teachings herein.

Figure 3:
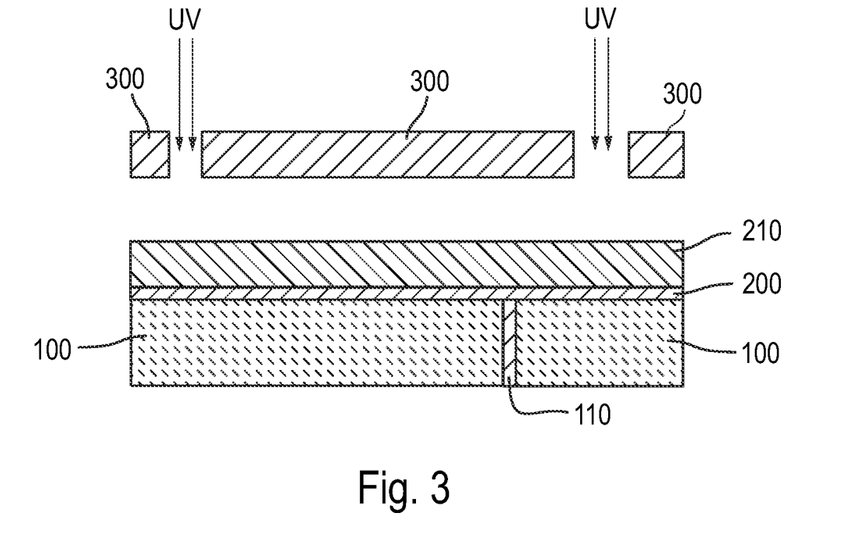
FIG. 3 depicts the use of a mask with UV light in photolithography to fabricate a MEMS component.

With respect to FIG. 3, the first layer of photoresist 210 is applied on top of the seed layer 200. The photoresist 210 is typically a photo-patternable polymer. While depicted in FIG. 3 as positive, photoresists 210 used herein may be positive or negative. For positive resists, the resist is exposed to a certain type of radiation wherever the resist is to be removed. In these types of resists, the radiation changes the chemical structure of the resist so that it becomes more soluble in a developer. The exposed resist is then washed away by the developer solution, leaving only the resist that was not exposed to the radiation. Negative resists behave in an opposite manner. Exposure to the radiation changes the chemical structure of the resist so that it becomes more difficult to dissolve. Different types of photoresist may be utilized including photoresist which is capable of chemical structural change in the presence of visible light, x-rays, ultraviolet light, direct write e-beam exposure or other forms of radiation. In one embodiment of the present invention, a photoresist such as one produced by Shipley Electronic Materials, such as model number 1518 or 4620, is spun onto the seed layer 200. Other types of photoresists, such as polymethylmethacrylate (PMMA), Polyimide, SU8 or Shipley BPR 100 may be also be used. The photoresist 210 may be applied to the seed layer in many different fashions including spinning, electroplating, spray coating, a laminated dry-film process or patterned plated. After the photoresist 210 is spun, it is often oven or hot-plate baked in order to drive off solvents and/or harden.

Figure 4:
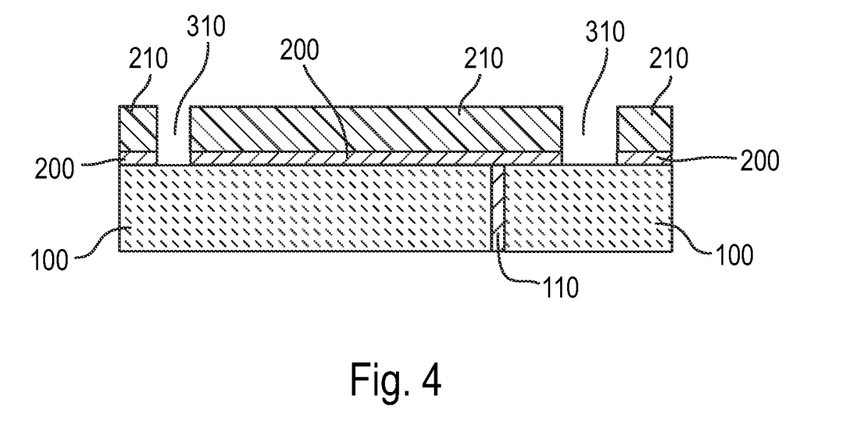
FIG. 4 depicts the creation of cavities on a plating surface.

FIG. 3 illustrates the use of a mask 300 to form a cavity in positive photoresist 210 (although a negative photoresist may also be used if the mask is inverted). The form of radiation beams down upon the mask 300 in the direction of the arrows marked UV, and passes through the mask 300 wherever the mask 300 has been modified to allow passage of the radiation. Other types of radiation, besides UV can also be used including those described above. The photoresist 210 is dissolved in the locations directly below the areas where the mask 300 has been modified, creating the cavities 310 as shown in FIG. 4. A mask 300 may be fashioned from anything that is capable of blocking the form of radiation that will otherwise expose the photoresist 210. For instance, if ultraviolet light is used to expose the photoresist 210, then the mask 300 must be capable of blocking ultraviolet light except in the locations where it has been modified (e.g., openings) to allow the ultraviolet light to pass. The mask 300 may be modified in numerous different ways to allow the radiation to pass through in select locations. For instance, if the mask 300 is intended to block ultraviolet light, then the mask 300 may consist of a glass plate with a thin film having UV blocking properties applied to it. The tint may then be etched off in the locations where the photoresist 210 is intended to be exposed. Numerous other ways of creating the same effect may be utilized depending on the type of radiation used and the composition of the mask 300.

If the process is being used to create microstructures that are to be electrically isolated from each other, yet reside on the same substrate 100, then the seed layer 200 may be etched in locations on the sides of the microstructure as shown in FIG. 4. For instance, this may be the case when forming a multitude of contacts for contacting semiconductors under testing situations. The etching may be accomplished using dry etching techniques such as ion milling or sputtering etch or a wet etch may also be used. For instance, in the case of the use of a Cr/Au seed layer, a wet etch consisting of a gold etch, such as iodine salt base etchant, may be followed by a commercial chrome etch. The seed layer 200 may also be patterned by shadow masking or lift-off processes. Once the seed layer 200 has been etched, the remaining photoresist 210 may be removed by any suitable method (including but not limited to dry etching techniques such as oxygen plasma or reactive ion etching, laser assisted etching, ablation, or by wet etch techniques such as those using acetone, methanol, IPA, acid strippers like Piranha or other solvents and strippers commonly known in the art.

Figure 5:
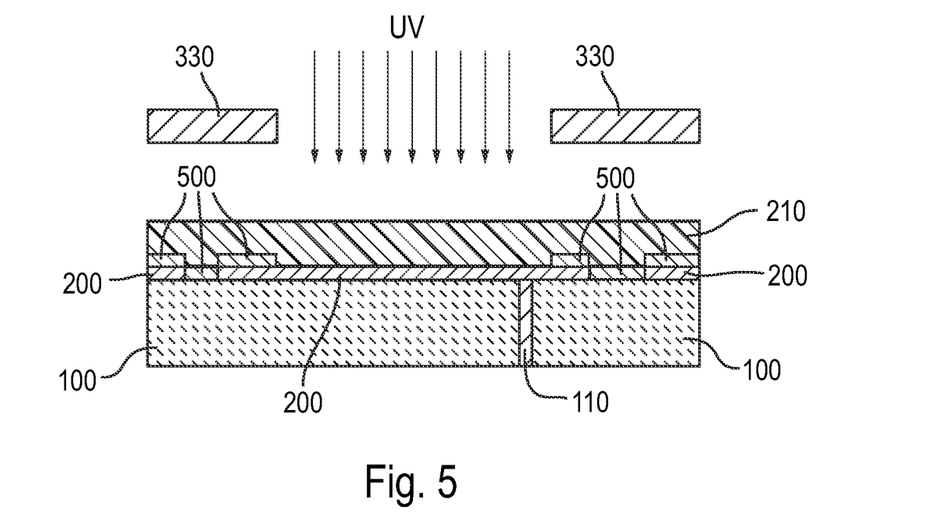
FIG. 5 depicts a second photoresist masked such that a cavity in the second photoresist in the shape of first layer of the microstructure.
Figure 6:
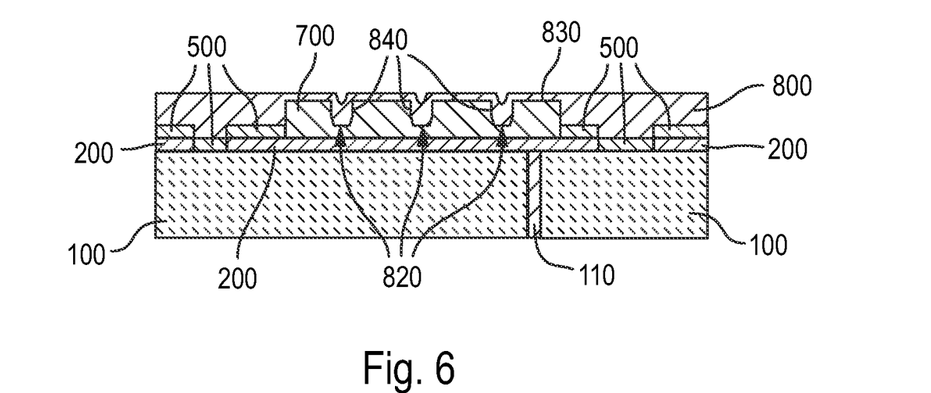
FIG. 6 depicts a primary metal pieces having cavities superfilled with a sacrificial secondary metal.

According to certain embodiments where the microstructure is electrically conducting signals to the via 110, yet is electrically isolated from other structures, a second seed layer 500 may be applied to substrate 100 (e.g., in the locations where the first seed layer 200 has been etched away) and over the first seed layer 200 so that the sacrificial secondary metal 800 may have an electrical connection on which to be electroplated, as shown in FIGS. 5 and 6. Preferably, this second seed layer 500 is of a different composition than the first seed layer 200, such that it may be etched away without etching away the first seed layer 210. In an embodiment, a second seed layer 500 of 300 A of Ti and 2000 A of Cu may be sputtered across the substrate 100 and first seed layer 200. The second seed layer 500 may be fashioned from many other compositions while maintaining the spirit of this invention. If a second seed layer 500 is used, then a portion of the second seed layer 500 can be removed so that the primary metal 700 forming the microstructure may have direct contact with the first seed layer 210. It should be understood that in embodiments where either the primary metal 700 structure is not designed to be electrically connected to the substrate 100, for instance, microstructures which are in their final form that will not be connected to the substrate 100, or in cases where the primary metal 700 structures do not need to be electrically isolated from one another, a second seed layer 500 may not be necessary and the first seed layer may not need to be patterned.

Once the appropriate plating base(s) have been formed, the primary metal 700 structures can be formed. In FIG. 5, a photoresist 210 is applied on top of the first 200 and second 500 seed layers (if the second seed layer 500 is indeed present). This photoresist 210 may be the same photoresist applied earlier or it may be a different photoresist depending on the thickness required for the layer, the polarity of the pattern (negative or positive) or any other material characteristic. The photoresist 210 is then exposed using a mask 330 such that a cavity is formed in the photoresist 210 in the shape that a primary layer 700 of the microstructure is to take as shown in FIG. 6.

After the cavity is exposed in the photoresist 210, a primary metal 700 that will be used to form the microstructure may be electroplated into the cavity as shown in FIG. 6. The primary metal 700 may be of any type of metal, for instance an alloy of Ni—Mn may be electroplated into the cavity in the amount of 20-25 μm. Because the primary metal 700 can be lapped and polished in order to planarize the layer and achieve a uniform controlled thickness, the primary metal 700 is typically plated slightly thicker than the layer's desired final thickness. The rest of the photoresist 210 is then removed in any suitable method, such as the one described above.

Use of 1 Sacrificial Secondary Metal

The sacrificial secondary metal 800 can be electroplated onto the secondary seed layer 500 (or the primary seed layer 200 according to other embodiments) and the primary metal 700 as shown in FIG. 6. The secondary metal 800 may be any electrodepositable metal that may be selectively etched or removed without substantially effecting the primary metal 700. The secondary metal 800 can be a high stress metal, which generally relates to 50 MPa or above, tensile stressed 200 GPa and above. According to preferred embodiments, covering the first layer of the primary metal 700 with the secondary metal 800 facilitates machining of the surface of both the primary 700 and secondary metals 800 because of the mechanical stability which the secondary metal 800 provides to the primary metal 700. If one attempted to machine the isolated primary metal 700 structure without anything surrounding it, one would risk substantial damage to the often fragile primary metal 700 structure such as ripping off portions of the primary metal 700 structure. The photoresist 210 is relatively weak mechanically and thus if it was the only thing that remained around the primary metal 700, the photoresist 210 could rip and tear as it is being machined (thus, not providing a smooth, regular planar structure). Additionally, the photoresist 210 is not capable of providing the horizontal support to the primary metal 700 that is needed during machining. Finally, an added advantage the sacrificial secondary metal 800 affords is that it conveniently provides a conductive plating base for subsequent layers of primary metal that overhang underlying primary metal structures. Otherwise, the overhanging plating would require an additional thin film seed layer deposition step. Regardless of its use for mechanical support or as a conductive plating base, the secondary metal 800 is entirely sacrificial, meaning that it will be completely removed before the final product, made of primary metal, is formed.

In one embodiment, the sacrificial, secondary metal 800 may be copper, a copper alloy, Cu—S, Ag, Ag—Sn, Cu—Ni, or any other suitable metal, and can be electroplated around the primary metal 700. The sacrificial, secondary metal is preferably deposited, or more preferably electroplated, around the primary metal 700 such that it covers primary metal 700 surfaces lacking cavities or wells, and horizontal surface planes 830, at a slower speed than deposition within vertical wells 820 or spaces between primary metal features. Deposition along vertical surface planes 840, such as cavities, vertical wells 820, and spaces between primary metal features is done at a faster rate compared to horizontal deposition, and is referred to herein as "superfilling." Stated otherwise, the deposition rate of the sacrificial secondary metal 800 is greater at the bottom of a primary metal 700 feature or structural opening than at the top surface of the feature or structural opening.

Superfilling is advantageous as it prevents voiding in the deposited sacrificial, secondary metal 800 and thus provides enhanced structural stability for the primary metal 700 during the machining process, compared to secondary metal having voids. Machining can, in general, relate to grinding, lapping, polishing, chemo-mechanical polishing, electric discharge machining, or any other commonly encountered machining processes.

Controlling the rate of vertical and horizontal deposition of a sacrificial, secondary metal can be done using suitable technique, such as those provided in Dubin and Andricacos, and the references cited and incorporated therein. Superfilling is a highly variable technique that depends on multiple factors, non-exclusively including: analytical reagents, additives, chemistry, and the critical dimension, which relates to the smallest feature that can be uniformly etched onto a given MEMS piece. Those with skill in the art will readily be able to assess the relevant variables needed for superfilling to sufficiently control rate control of secondary metal deposition.

Figure 1:
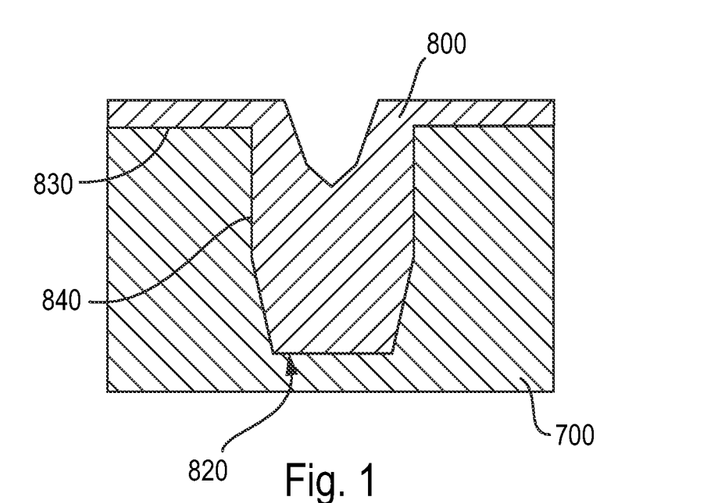
FIG. 1 depicts a cavity superfilled with a secondary metal.
Figure 2:
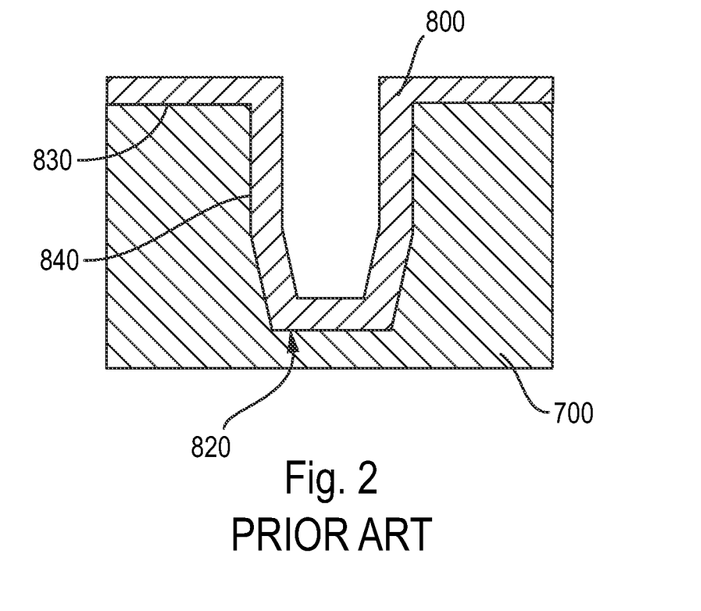
FIG. 2 depicts a prior art method of filling a cavity with a secondary metal.

According to more specific embodiments, the secondary metal can be deposited using a variety of techniques, including electroplating, electrolysis, sputter deposition, E-Beam evaporation. Rate control of secondary metal deposition can be achieved through the use of additives in the secondary metal plating bath. Electrolytic plating from appropriately formulated solutions is one of the best ways to accomplish superfilling. In order to prevent the formation of voids in the secondary metal 800, the rate of electroplating should be higher at low or deep points within primary metal features 700 than elsewhere. A comparison between superfilling secondary metal and traditional secondary metal deposition is respectfully shown in FIGS. 1 and 2. As shown in FIG. 1 secondary metal 800 deposition between primary metal 700 features, such as wells 820, by using additives to the plating bath is faster than outside deposition along horizontal surfaces 830, for example. The preferential deposition in the interior features may be due to lower transport rates of additives at those locations which in turn leads to an increase in the local rate of secondary metal deposition in wells 820. Specifically at interior corners, the rate of additive transport is lowest thus the rate of secondary metal deposition is highest. In contrast, and as shown in FIG. 2, the rate of secondary metal deposition between primary metal 700 features using conventional secondary metallization techniques is slower. These conventional methods lead to voiding in the secondary metal 800 and thus deplete the support strength provided to the primary metal 700, during machining.

Additives may be added to the secondary metal plating bath for accomplishing superfilling. Copper plating from solutions incorporating additives conventionally used to produce level deposits on a rough surface can be used to accomplish superfilling to fill cavities between primary metal features. One suitable system of additives is the one marketed by Enthone-OMI, Inc., of New Haven, Conn. and is known as the SelRex Cubath M system. The above additives are referred to by the manufacturer as MHy. Another suitable system of additives is the one marketed by LeaRonal, Inc., of Freeport, N.Y., and is known as the Copper Gleam 2001 system. The additives are referred to by the manufacturer as Copper Gleam 2001 Carrier, Copper Gleam 2001-HTL, and Copper Gleam 2001 Leveller. Still another suitable system of additives is the one marketed by Atotech USA, Inc., of State Park, Pa., and is known as the Cupracid HS system. The additives in this system are referred to by the manufacturer as Cupracid Brightener and Cupracid HS Basic Leveler.

Plating additives that can allow superfilling can include brighteners (also known as accelerators), surfactants, levelers, suppressors, for example. Brighteners, or accelerators, typically comprise sulfur-containing organic compounds, and may also incorporate functional groups, such as described for example in U.S. Pat. No. 5,252,196 to Sonnenberg et al., the subject matter of which is incorporated herein by reference in its entirety. Examples of brighteners include Sulfopropyl disulfide (SPS) and mercaptopropanesulfonic acid (MPS). Any suitable surfactant, such as polyethylene glycol (PEG) can be used in the secondary metal baths provided herein. Levelers or leveling agents can include polyamines and reaction products of an amine with an alkylene oxide and epihalohydrins as well as dye compounds such as phenazinium compounds, as described for example in U.S. patent publication No. US 2007/0108062 to Brunner et al., U.S. patent publication No. US 2006/0226021 to Brunner et al., and U.S. patent publication No. US 2004/0231995 to Murao, the subject matter of each of which is incorporated herein by reference in their entireties. One example of a leveler is Janus Green B. Organic polymers can be used as the suppressors for copper electroplating. Further additives and/or by-products can also be introduced to the secondary metal electroplating solution.

One preferred plating solution of copper that can be used as a sacrificial secondary metal 800 includes the following ingredients: Cu 50 g/l, Acid 80 g/l, Cl 50 ppm, Accelerator 12 mL/L, Suppresser 2 mL/L, and Leveler 3 mL/L.

Examples of specific additives which may be added to a bath in the instant invention are described in several patents. A few are listed herein and each is incorporated by reference in their entireties. U.S. Pat. No. 4,110,176, discloses the use of additives such as poly alkanol quaternary-ammonium salt which forms as a reaction product to give bright, highly ductile, low stress and good leveling copper deposits from an aqueous acidic copper plating bath. U.S. Pat. No. 4,376,685, to A. Watson, describes plating bath additives such as alkylated polyalkyleneimine which form as a reaction product to provide bright and leveled copper electrodeposits from an aqueous acidic bath.

U.S. Pat. No. 4,975,159, to W. Dahms, describes many different organic additives, including at least one substituted alkoxylated lactam as an amide-group-containing compound in an amount to optimize the brightness and ductility of the deposited copper, that can be introduced to secondary metal plating baths according to the teachings herein. The additives provided in Tables I, II, and III can be used, as suitable, with the teachings herein. These additives non-exclusively include alkoxylated lactams, sulfur-containing compounds with water-solubilizing groups such as 3-mercaptopropane-1-sulfonic acid, and, organic compounds such as polyethylene glycol.

U.S. Pat. No. 3,770,598, to H-G Creutz, describes acidic copper baths containing a brightening amount of the reaction product of polyethylene imine and an alkylating agent to produce a quaternary nitrogen, organic sulfides carrying at least one sulfonic group, and a polyether compound such as polypropylene glycol.

U.S. Pat. No. 3,328,273, to H-G Creutz et al., describes copper sulfate and fluoborate baths for obtaining bright, low-stress deposits with good leveling properties that contain organic sulfide compounds of the formula $XR_1-(S_n)-R_2-SO_3H$, where $R_1$ and $R_2$ are the same or different and are polymethylene groups or alkyne groups containing 1-6 carbon atoms, X is hydrogen or a sulfonic group, and n is an integer of 2-5 inclusive. Additionally these baths may contain polyether compounds, organic sulfides with vicinal sulphur atoms, and phenazine dyes. Table I and Table II of this patent provide specific additives including polysulfide and polyether compounds which may be added to a sacrificial secondary metal bath using the teachings herein.

Adding chloride ion and MHy additive to a secondary metal solution, such as 0.3 M cupric sulfate and 10% by volume sulfuric acid, can lead to superfilling. MHy concentrations that produce superfilling can be in the range from about 0.1 to about 2.5 percent by volume. Chloride ion concentrations that allow superfilling can be in the range from 10 to 300 ppm. Similar superfilling results can be obtained from a solution containing cupric sulfate in the rate from 0.1 to 0.4 M, sulfuric acid in the range from 10 to 20% by volume, chloride in the range from 10 to 300 ppm, and LeaRonal additives Copper Gleam 2001 Carrier in the range from 0.1 to 1% by volume, Copper Gleam 2001-HTL in the range from 0.1 to 1% by volume, and Copper Gleam 2001 Leveller in the range 0 to 1% by volume. Finally, similar superfilling results can be obtained from a solution containing cupric sulfate, sulfuric acid, and chloride in the ranges mentioned above and Atotech additives Cupracid Brightener in the range from 0.5 to 3% by volume and Cupracid HS Basic Leveller in the range from 0.01 to 0.5% by volume.

The superfilling techniques used herein are not directed to encasing features less than 5 micrometers. More specifically secondary metallization herein is used to encase 50-100 micron primary metal (e.g., nickel) features.

The plating processes provided herein can be accomplished by several methods, including full submersion into the electrolyte or meniscus plating where the substrate surface is held in contact only with the free surface of the electrolyte (as opposed to submerged in the electrolyte), such as in a cup plating cell. (See U.S. Pat. No. 4,339,319, to S. Aigo, which is incorporated herein by reference in its entirety). When the surface to be plated is held in contact with the meniscus of the electrolyte during plating, cavities of large widths (50-100 microns) can be filled rapidly and evenly at the same rate. The superfilling properties of meniscus plating is due to the higher concentration and perhaps different orientation of the surface-active additive molecules at the air-liquid surface. Though these molecules may begin to redistribute when the surface to be plated is introduced, residual effects probably persist throughout the plating period, several minutes in duration. Paddle plating cells are not preferred for plating the wider cavities (50-100 microns) present in MEMS fabrication.

The electroplated sacrificial secondary metal is preferably substantially made of Cu and may also contain small amounts of atoms and/or molecular fragments of C (less than 2 weight percent), with O (less than 1 weight percent), N (less than 1 weight percent), S (less than 1 weight percent), or Cl (less than 1 weight percent). These additional components apparently originate from the decomposition of additives and are subsequently incorporated in the deposit in the probable form of molecular fragments rather than atoms.

Methods of controlling additives in a copper plating solution are also provided in U.S. Pat. No. 6,592,747 to Horkans, et al., which is expressly incorporated herein in its entirety. This patent teaches organic addition agents in copper plating baths that are monitored by diluting a sample of the bath with sulfuric acid and hydrochloric acid and optionally a cupric salt. The dilution provides a bath having conventional concentrations of cupric ion, sulfuric acid and hydrochloric acid; and adjusted concentrations of the organic addition agents of 1/X of their original values in the sample; where X is the dilution factor. CVS techniques are used to determine concentrations of organic addition agents.

The following disclosure is directed to embodiments where only 1 secondary metal is used, and is expressly not applicable to embodiments below directed to the use of 2 or more sacrificial secondary metals. The secondary metal 800 may or may not be plated across the entire substrate 100. However, the layers of secondary metal 800 that are plated across the entire substrate 100 should not to be so thick or so numerous that they cause any non-negligible amount of warpage of the substrate 100. It is important to note that the majority of secondary metal 800 layers are preferably not plated across the entire substrate 100, but rather are only plated in areas surrounding the primary metal 700 structure and any subsequent (higher layer) primary metal structures such that they add the mechanical stability to the primary metal 700 structure needed during machining (e.g., lapping and polishing) and provide a plating base for subsequent overhanging layers.

The additional stress that is added to a substrate 100 when secondary metal 800 is plated across the entire length of the substrate 100 (other than as noted above) has been shown to potentially warp the substrate 100. The warpage of the substrate 100 makes it difficult or impossible to planarize it to a uniform height. However, planarization is desirable for lithography and subsequent machining and thus is undesirable when building several (or large) microstructures on the same substrate 100. Thus, the majority of the secondary metal 800 layers is preferably plated to a length and thickness such that it adds the structural stability to the primary metal 700 structure, and prevents voiding in the secondary metal 800 between primary metal features 700. According to certain embodiments, the secondary metal 800 is plated in a region that covers any of the following percentages: 80%, 50%, 30%, or 10% of the substrate 100, or substantially so. In other embodiments, the secondary metal 800 is plated in a region that covers any of the following percentages: 80% or less, 50% or less, 30% or less, or 10% or less of the substrate 100, or substantially so. According to further embodiments, the area of the region in which the secondary metal 800 is plated is either ten times, six times, or four times the area of the layer of the primary metal 700. In other embodiments, the region in which the secondary metal 800 is plated surrounds the primary metal surface and the thickness is greater than 1×, but less than 2×, the thickness of a horizontal surface layer of the primary metal 700. It is also noted that the secondary metal 800 does not technically touch the substrate 100 because the substrate 100 is already covered by a plating base(s)) 200 and/or 500.

The process steps above may be repeated until the primary metal 700 structure is in its final form. The secondary metal 800 can be etched away using an etching agent that will not substantially etch or otherwise damage the primary metal 700 or the first seed layer 200. As one example, the etchant is typically an aqueous solution of acid, such as ferric chloride, and can be heated and directed under pressure to both sides of the plate. The etchant reacts with only the sacrificial secondary metal, and preferably corrodes it away fairly quickly.

Additionally, the secondary seed layer 500 (if present) may be etched away, also using an etching agent which will not substantially etch or damage the primary metal 700 or first seed layer 200, leaving only the primary metal 700 structure and the first seed layer 200 on the substrate 100. If the primary metal 700 structure is not intended to be attached to the substrate 100, then the first seed layer 200 can also be etched away using an etching agent that will not substantially affect the primary metal 700 structure. It is preferred that the primary metal 700 is machined to provide a planarized structure with no dimples or depressions on the surface.

Additional and alternative procedural steps from those provided above can be used for MEMS fabrication as desired. For example, one or more additional photoresists can be spun on top of the planarized primary and secondary metals of the unit. Likewise, one or more masks can be used again to pattern the one or more photoresists in the desired fashion to create a cavity for the next layer of primary or secondary metal to be electroplated. Depending on the number of primary metal 700 structures being formed on the substrate 100, there may be many secondary metal "islands" that are electroplated.

Use of 2 Different Secondary Metals

According to different embodiments the secondary metal is not plated using photolithography to the space immediately around the primary metal. Instead, both a first secondary metal 800 and second secondary metal 900 are both plated across the entire substrate 100 for each layer of primary metal 700, without causing the substrate 100 to warp. It is noted that the secondary metals do not necessarily need to directly contact the substrate 100 because the substrate 100 may be already covered by a plating base(s). Accordingly, the phrase plating over the entire substrate 100 as used herein can simply refer to the entire surface area encompassed by the substrate 100 and not necessarily the substrate itself.

Plating over the entire substrate can be done for a majority of layers, including every layer, in any suitable MEMS structure, including those having 10 or more, 15 or more, or 20 or more layers, for example. The combination of plating both the first 800 and second secondary metal 900 over the entire substrate 100 is unique in that it provides mechanical stability to the primary metal 700 structure needed during machining (e.g., lapping and polishing) and provides a plating base for subsequent overhanging layers, without warping the substrate 100. Additionally, depositing the first secondary metal 800 and the second secondary metal 900 is not limited to a photolithography process and thus does not require custom designed photoresists, masks, and UV radiation for plating around the primary structure 700. It is important to note that prior art methods, such as Garabedian and Tang, teach away from plating secondary metals over the entire substrate for each level in a multiple level MEMS structure. These references discourage practicing the steps of this embodiment because those with skill in the art had not figured out a way to plate sufficiently supportive secondary metals over the entire substrate for each layer of a multi-layer MEMS structure without warping the supporting substrate 100. When the substrate 100 is warped it is detrimental because it makes it difficult to planarize the primary metal 700 to a uniform height. During MEMS fabrication, it is highly desirable that the primary metal 700 is machined to provide a planarized structure with no dimples or depressions on the surface.

Following the disclosure of Tang, the deposition of the secondary metal is limited by the pattern created by a photoresist, mask, and radiation. Developing photoresists, masks, and applying radiation are time consuming steps and minimizing their use simplifies MEMS fabrication. In contrast to Tang, this specific embodiment is directed to simply dipping the primary metal structure 700 into an electrolytic secondary metal plating bath to coat the entire surface of the substrate 100. The need for creating specific photolithography cavities for the secondary metal pattern is eliminated using this embodiment Both the first secondary metal 800 and the second secondary metal 900 should have similar and different properties with respect to each other. More specifically it is preferred that the first secondary metal 800 is a higher density metal than the second secondary metal 900 yet that both sacrificial metals can be etched away using the same etching agent that does not harm the primary metal 700. According to further embodiments, the first 800 and second 900 secondary metals can differ in one or more of the following characteristics: grain size, grain lattice structure, or ingrain impurity composition. More specifically it is preferred in certain embodiments, that the first secondary metal 800 is a thin, high-density, fine-grain layer, while the second secondary metal 900 layer is thicker, 10 to 200 um, and preferably of sufficient thickness to entirely cover the primary metal, low-density, and of a coarser-grain. According to certain embodiments, the second secondary metal 900 can be the same type of metal as the first secondary metal 800 but mixed with a filler having a lower density than the first secondary metal 800, such as ceramic, for example.

Figure 7:
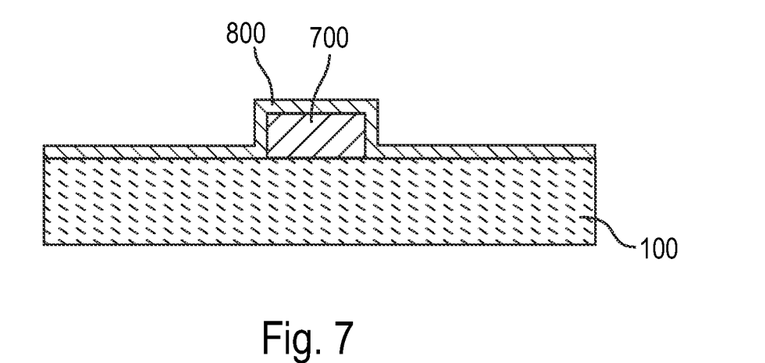
FIG. 7 depicts a first secondary metal plated over a primary metal.

According to this embodiment, and as shown in FIG. 7, the first secondary metal 800 is preferably very thin, and has a high density to provide structural support to the primary metal 700. The first secondary metal 800 can be a high stress metal, which generally relates to 50 MPa and above. The first secondary metal 800 is preferably plated in a thin layer, such as at a thickness between 1000 angstroms to 50 micrometers. If one were to only plate the thin, high density first secondary metal 800 over the entire area of the substrate 100 for each layer of a multi-layer MEMS structure (as shown in FIG. 7) there would likely not be enough structural support for the primary metal piece 700 during machining (e.g., grinding, lapping, polishing, chemo-mechanical polishing, electric discharge machining, or any other commonly encountered machining processes). In contrast, if a thick layer of high density secondary metal was to be plated over the entire substrate, such that the first secondary metal 800 also covered the area represented by the second secondary metal 900 in FIG. 8, the substrate 100 would likely warp.

Figure 8:
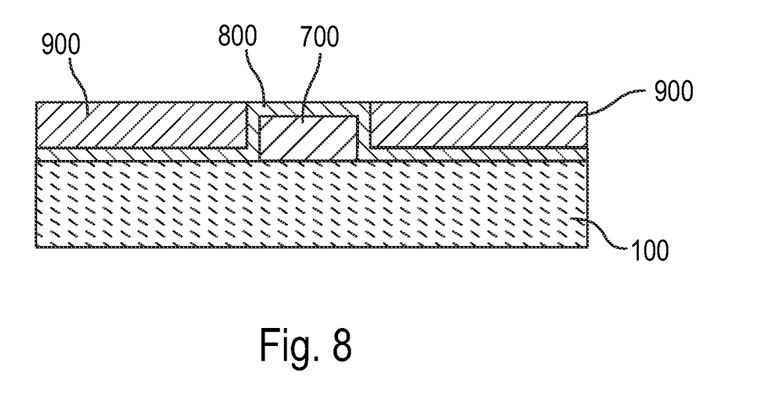
FIG. 8 depicts a first and second secondary metal plated over a primary metal.

To solve the above problem a second secondary metal 900 having a lower density than the first secondary metal 800, can be thickly plated over the first secondary metal 800 such that it covers the entire substrate 100 surface. The second secondary metal 900 can be a low stress metal, which generally relates to a 50 GPa or lower. The second secondary metal 900 is preferably plated in a thick layer, such as at a thickness between 10 to 200 microns. The combination of a first, high-density, secondary metal 800 and a second, low-density, secondary metal 900 is shown in FIG. 8. Advantageously the addition of the lower density of the second secondary metal 900 helps provide sufficient structural support to the primary metal 700 during machining, while providing less overall mechanical stress on the substrate 100 compared to a thick, first secondary metal 800 plating alone.

The secondary metals 800 and 900 used herein should be readily suitable for planarization by common machining techniques including grinding and abrasive lapping, for example and are preferably conductive. In one embodiment, the sacrificial, first secondary metal 800 may be copper, a copper alloy, or any other suitable metal, and can be electroplated around the primary metal 700. The second secondary metal is not the exact metal of the first secondary metal 800 but can be a different type of copper, copper alloy, or other suitable metal that can be electroplated. Potential second secondary metals include porous, grain stabilized, and composite metals such as: Cu, Pb, Ag, Au, Sn, In, Pb—Sn, and the like and alloys of the like, those familiar to the art of electrodeposition. According to certain embodiments, a copper composite with a suspension of ceramic powder may be used.

The process steps of plating primary metal structures 700 and two different secondary metals 800 and 900 described above can be repeated to create a multiple layered intermediary MEMS structure. The primary metal 700 and secondary metal 800 and 900 complex can then be machined until the primary metal 700 is in the desired form.

Regardless of its use for mechanical support or as a conductive plating base, the first secondary metal 800 and second secondary metal 900 are both entirely sacrificial, meaning that they will be completely removed before the final product, made of primary metal 700, is formed. Both of the secondary metals 800 and 900 (and any other secondary metals that may be present) can be etched away using an etching agent that will not substantially etch or otherwise damage the primary metal 700. According to even more specific embodiments, both the first 800 and the second 900 secondary metals (and any additional secondary metals) can be etched away using the same etching agent, such that a user does not need to use two different etching baths for each of the secondary metals. As one example, the etchant is typically an aqueous solution of acid, such as ferric chloride, and can be heated and directed under pressure to both sides of the plate. The etchant reacts with only the sacrificial secondary metals, and preferably corrodes them away fairly quickly.

Additionally, any seed layers, such as the primary and secondary seed layers, can also be etched away using different etching agents or the same as those used for the secondary metals. Preferably, each secondary metal and each seed layer can be removed with the same etching agent, in one step, without damaging the primary metal structure 700.

While this embodiment has been mainly directed to the use of only a first and second sacrificial secondary metal, those with skill in the art will recognize that even more types of sacrificial metals can be plated without deviating from the teachings herein. The use of a third or fourth sacrificial secondary metal, for example is readily contemplated herein. Likewise, it is preferred that each plated secondary metal can be etched away with the same etching agent such that it does not damage the primary metal 700.

For embodiments where more than one secondary metal is used, the first sacrificial secondary metal can be deposited via superfilling in an openings present in the primary metal according to the teachings in the above embodiments.

The invention may be embodied in other specific forms besides and beyond those described herein. The foregoing embodiments are therefore to be considered in all respects illustrative rather than limiting, and the scope of the invention is defined and limited only by the appended claims and their equivalents, rather than by the foregoing description.

The invention claimed is:

1. A process for fabricating a component of a micro-electro-mechanical system, comprising:

a) providing a primary metal structure having cavities along its surface area, the cavities defining predetermined shapes in predetermined locations and having depths of at least 5 micrometers and adapted to receive therein an electroplated sacrificial secondary metal that assists in supporting the primary metal structure;

b) depositing a sacrificial secondary metal around the primary metal structure, such that the rate of deposition is faster within the primary metal structure's cavities than outside of the cavities, to form a complex of primary and secondary metal;

c) machining the complex of primary and secondary metal; and d) etching away the secondary metal from the machined primary metal structure to form a micro-electro-mechanical system component; wherein the micro-electro-mechanical system is a spring that can be used in conjunction with a probe card assembly to test semiconductor devices.

2. The process of claim 1, wherein the etching away of the sacrificial secondary metal does not substantially etch the machined primary metal structure.

3. The process of claim 1, wherein the deposited secondary metal provides horizontal mechanical support to the primary metal during machining.

4. The process of claim 1, wherein the primary metal comprises nickel.

5. The process of claim 1, wherein the secondary metal comprises copper.

6. The process of claim 1, wherein the deposited secondary metal lacks significant voiding.

7. The process of claim 1, wherein the deposited sacrificial secondary metal is electroplated from a plating bath comprising organic additives selected from the group consisting of brighteners, levelers, and suppressants.

8. The process of claim 7, wherein the plating bath comprises copper at 50 g/L, acid at 80 g/L, chloride at 50 ppm, a brightener at 12 mL/L, a suppresser at 2 mL/L, and a leveler at 3 mL/L.

* * * * *